Jan. 13, 1970    J. CHAMBERLAIN ET AL    3,488,951
CONTROLLABLE INJECTOR FOR ROCKETS
Filed Aug. 19, 1964    3 Sheets-Sheet 1

INVENTORS
JOHN CHAMBERLAIN
DAVID L. BOGUE
BY Jack N. M. Cathy
AGENT

INVENTORS
JOHN CHAMBERLAIN
DAVID L. BOGUE
BY Jack N. Mc Carthy
AGENT

Jan. 13, 1970   J. CHAMBERLAIN ET AL   3,488,951
CONTROLLABLE INJECTOR FOR ROCKETS
Filed Aug. 19, 1964   3 Sheets-Sheet 3

INVENTORS
JOHN CHAMBERLAIN
DAVID L. BOGUE
BY Jack N. M. Carthy
AGENT

United States Patent Office 3,488,951
Patented Jan. 13, 1970

3,488,951
CONTROLLABLE INJECTOR FOR ROCKETS
John Chamberlain, North Palm Beach, and David L. Bogue, Jupiter, Fla., assignors to United Aircraft Corporation, East Hartford, Conn., a corporation of Delaware
Filed Aug. 19, 1964, Ser. No. 390,521
Int. Cl. B05b 7/12; F02g 1/06
U.S. Cl. 60—39.74
13 Claims This invention relates to an injector particularly adapted for varying flow of fluid propellants to a rocket combustion chamber.

One object of this invention is to provide injection means which are variable so as to be able to change the flow of fluid propellants to obtain a variable thrust.

Another object of this invention is to provide a variable injector which is applicable to rockets of almost any size.

A further object of this invention is to provide injection means which are variable so that acceptable injection pressure drops can be maintained throughout a wide range of propellant flows; high enough pressure drop at the low flows to provide flow stability and combustion stability; yet low enough pressure drop at the high flows so as to minimize the propellant pressure required.

Another object of this invention is to provide a propellant injector which has excellent durability at both high and low chamber pressures and provides a reliable, precise, and effective means of varying injection area.

A further object of this invention is to provide an injector element which can be used by itself for a small injector or used in groups to provide for larger injectors.

Another object of this invention is to provide an injector which will have substantially the same amount and proportion of propellants flowing from each of the plurality of nozzles over its face.

A further object of this invention is to provide a variable flow injector which can be operated to maintain a uniform burner exhaust gas temperature.

Other objects and advantages will be apparent from the specification and claims and from the accompanying drawings which illustrate an embodiment of the invention.

Figure 1:
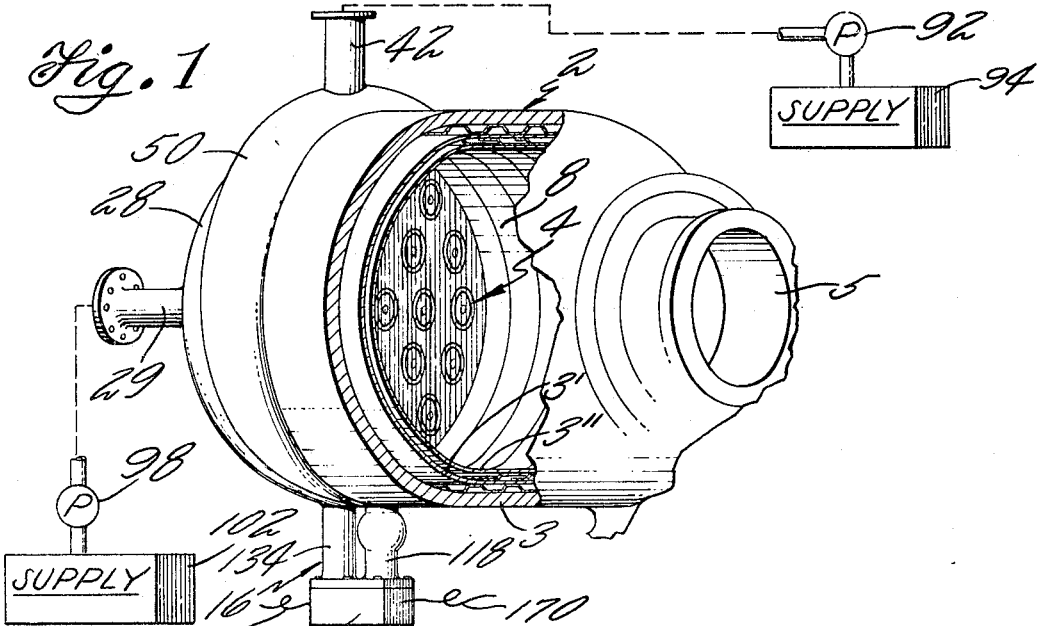
FIGURE 1 is a schematic showing of a combustion chamber having an injector as herein disclosed.

Referring to FIGURE 1, a combustion chamber 8 is shown having a wall 2 and an injector face 4. The wall is constructed having an outer side wall 3 along with two inner walls 3′ and 3″ separated by corrugated elements. The combustion chamber 8 is provided with a necked-down portion 5 formed by wall 2 through which gases are transmitted. The injector is formed having five main elements: (1) a plate 32 whose face 4 forms chamber 8 with inner wall 3″, (2) a main divider plate 14 which separates the two fuels or propellants and provides a chamber 38 with plate 32, (3) a cap 28 which covers the rear of the injector so as to provide a chamber 26 with plate 14, (4) one or more injector units 1 through which the fuels are injected into the chamber 8, and (5) control means 16 for regulating the flow of each of the propellants through each injector unit.

Figure 3:
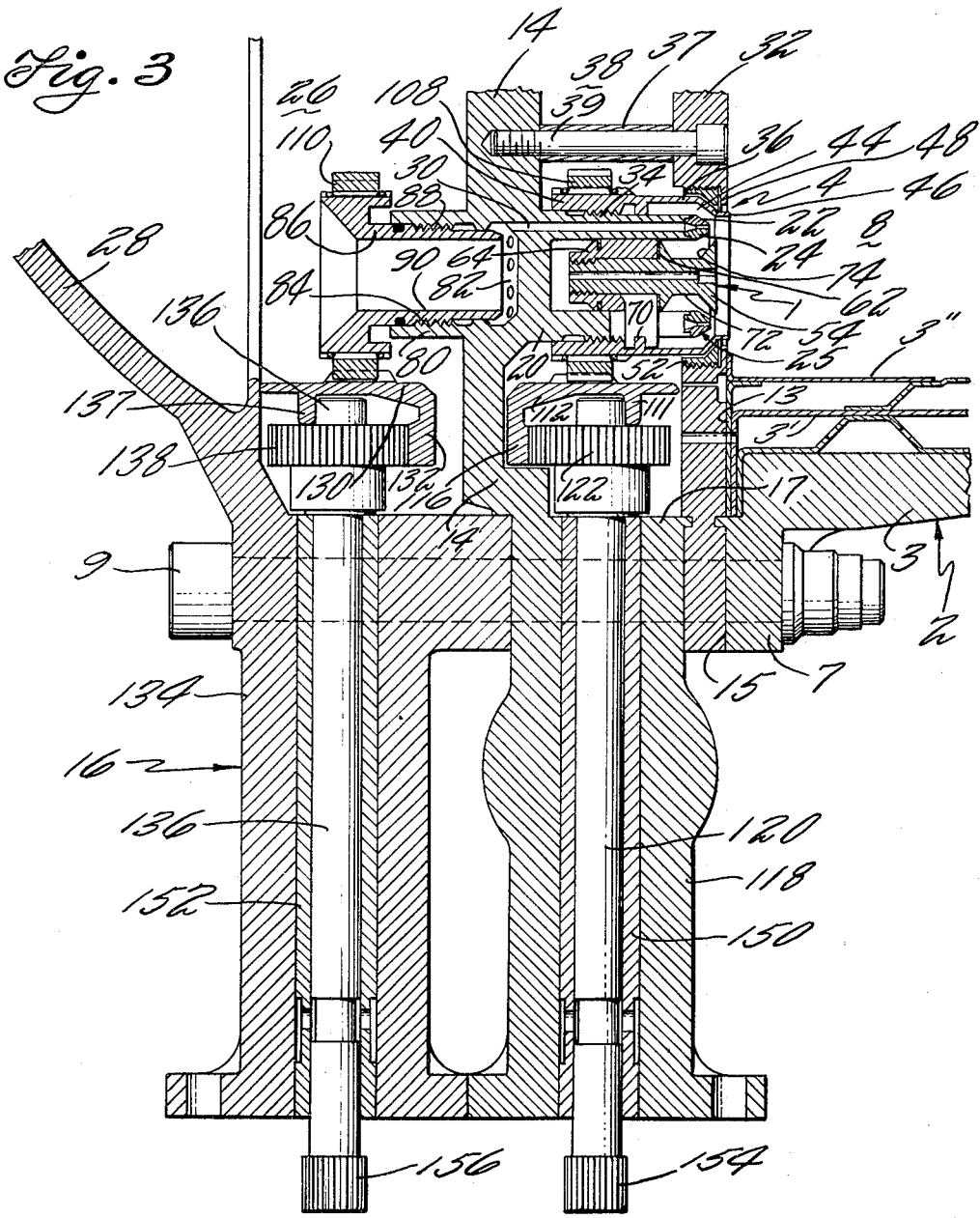
FIGURE 3 is an enlarged sectional view of the control connection to the injector units.

As seen in FIGURE 3, the composite wall of the combustion chamber 8 is formed having the inner walls 3′ and 3″ fixed together with the corrugated spacer elements. These members in turn present a flat annular face 13 for engagement with the front injector face 4 adjacent its outer edge and bend outwardly to form an annular flange which is held against movement by the end of wall 3 and face plate 32. The inner end of wall 3 has an outwardly projecting flange 7 with a flat annular face 15 which engages the outer annular mating portion of the face plate 32. Intermediate plate 14 has an axially extending rim 17 located in a position whereby its outer edge is against the opposite outer mating portion of the plate 32. Rim 17 has a plurality of openings extending therethrough around its periphery for a purpose to be hereinafter described. The outer edge of cap 28 is aligned with the outer edges of plate 14 and face plate 32. The cap, two plates and the combustion wall are bolted together by a plurality of bolts 9. The plates 14 and 32 are maintained the proper distance apart throughout by spacers 37. A bolt 39 passes through each spacer and draws the plates together against the ends of the spacer.

As mentioned in the objects, an injector can consist of a face plate having one injector unit or more depending on the size of the injector desired. As can be seen from FIGURES 2 and 3, an injector unit 1 cooperates with plates 14 and 32 but is also partly formed integral with plate 14. A large hole 11 is cut in the face plate 32 to accept each injector element. An annular projection 20 extends from the intermediate plate 14 and is aligned with and extends into a cooperating opening 11. The free end of the annular projection 20 has an annular nozzle 25 attached thereto having tapered sides 22 and 24. A plurality of passageways 30 extends for the length of the annular projection 20 to transfer a fuel or propellant from the chamber 26 to the annular nozzle 25. The annular nozzle 25 can be constructed as a single unit or made of two separate rings fixed to the end of annular projection 20. The nozzle 25 is made of a highly conductive and heat resistant material, such as copper or nickel, to avoid burning of the nozzle. Annular projection 20 is externally threaded at 34 to receive a metering sleeve 36 having internal threads at 40. It can be seen that rotation of the sleeve 36 will provide for axial movement of the sleeve along the projection 20.

The end of the sleeve 36 adjacent the annular nozzle 25 is tapered inwardly at 44 to approximately the same angle as the tapered face 22 of the nozzle. The inward taper at 44 extends inwardly to a point forming an opening which is smaller in diameter than the outer diameter of the annular projection 20 at its free end. At this point, the sleeve is provided with a short cylindrical section 46. This cylindrical section 46 is guided on a ring 48 which is held in place in face plate 32 by a nut 52 having a contoured inner face which does not interfere with the sleeve 36.

A core 54 is located in the space 56 formed within the annular projection 20. This core is connected to the sleeve 36 to move therewith in the following manner. The projection 20 has a plurality of slots 58 located between the passages 30 and extending through the projection. These slots receive synchronizing bars 60 which extend between the core 54 and the sleeve 36. These bars extend radially from the core and are fixed thereto between a flange 62 on the core and a nut 64. Shims 66 can be used to accurately position the bars 60. While the bars are fixed with respect to the core 54, they are only fixed axially with respect to the sleeve 36 and relative rotation is permitted therebetween. This is provided by a recess 68 in the top of each of the bars which receive an annular projection 70 which extends inwardly from the sleeve 36 adjacent the threaded area 40. It can be seen now that as the sleeve 36 is rotated, the projection 70 will move in and out along with the sleeve and that this in and out movement of the projection 70 will carry the bars 60 along with it in their cooperating slots and thereby move the core 54 in unison with the sleeve 36.

The core 54 is formed so that it has a necked-down portion 72 which is spaced inwardly from the annular projection 20 and flares outwardly at 74 at an angle so as to approximately parallel the tapered side 24 of the nozzle 25. This surface terminates at approximately the same point as the tapered surface 44 of the sleeve 36. The outward taper at 74 extends outwardly to a disk area which is larger than the inner diameter of annular projection 20.

It can now be seen that as the sleeve 36 and core 54 move in unison, the annular spaces between the annular tapered surface at 44 and the annular tapered side 22 and the annular flared surface at 74 and the annular tapered side 24 will increase or decrease depending on direction of movement.

An annular projection 80 integral with plate 14 is coaxially aligned with each annular projection 20. Recess 82 formed by each annular projection 80 has its bottom connected around its periphery to the passageways 30 which extend into the annular projection 20. The annular projection 80 is internally threaded at 84 to receive a sleeve 86 having external threads at 88. This sleeve has a passageway 90 therethrough which connects chamber 26 to the ends of openings 30 in the plate 14. The end of sleeve 86 which projects into the recess 82 is of such a length so as to restrict the area opening to the openings caused when the passages 30 intersect the bottom of the recess in plate 14. The diameter of the passageway 90 is less than the diameter of a circle touching the inner edges of the openings of passages 30 into the recess 82. It can be seen that as the sleeve 86 is rotated, it will move in and out to provide a variable restrictor for the flow to passages 30.

One propellant enters the system through a conduit 42 from a pump 92 and supply 94. This conduit 42 opens into a manifold 50 which extends around rim 17. The propellant in manifold 50 passes through the openings in rim 17 into the chamber 38 between the plate 14 and plate 32. The manifold extends from one side of the control means 16 and goes around the injector to the other side of the control means 16. The propellant from chamber 38 passes through openings 96 into the interior of sleeve 36. This propellant then flows through openings in the annular projection 20, such as 58, to arrive in the space between the core 54 and projection 20. This propellant is then projected as an annular ring into the chamber 8 from between the annular space between the annular tapered surface at 44 and the annular tapered side 22, and as an annular ring into the chamber 8 from the annular space between the annular flared surface 74 and the annular tapered side 24.

Another propellant enters the system through a conduit 29 from a pump 98 and a supply 102. This conduit 29 opens into cap 28 which in turn forms chamber 26 with the plate 14. This propellant from chamber 26 passes through passageways 90 of each sleeve extending into chamber 26. The propellant then is metered to the passages 30 to the annular nozzle 25; at this point the propellant is projected as an angular ring into the chamber 8 at a point between the two rings where the other propellant is being projected.

When a fuel and oxidant are used, the fuel is fed into chamber 38 and the oxidant is fed into chamber 26. In this instance, the oxidant would pass through the nozzle 25 and the fuel would be located therearound. By surrounding the oxidant with fuel, the possibility of splashing oxidant onto the injector face or chamber wall and causing burning of the metal is eliminated. Injection of the fuel next to the oxidant and at a sharp impinging angle provides a high rate of mixing so as to develop a relatively uniform mixture and temperature at the end of the combustion chamber.

Figure 2:
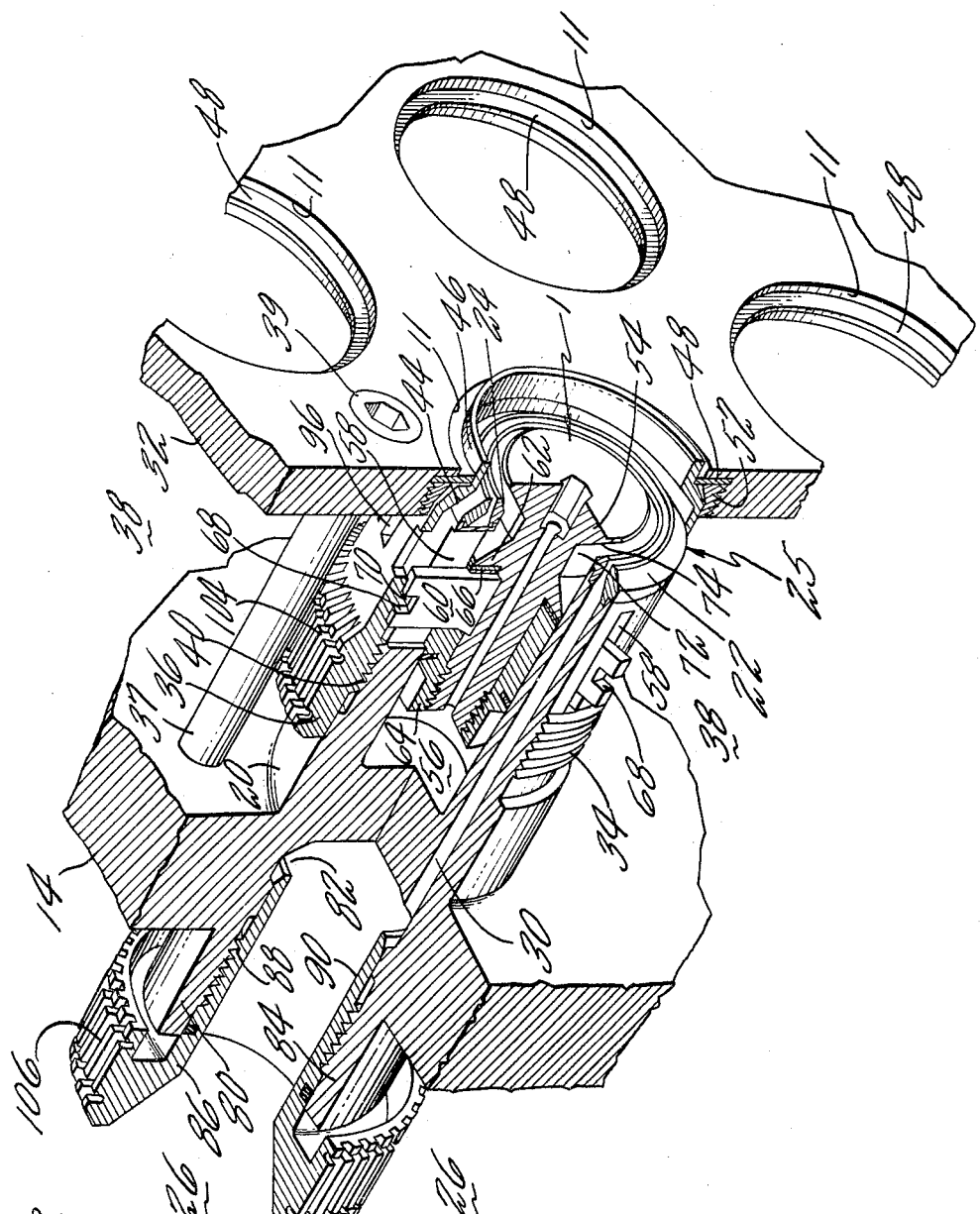
FIGURE 2 is an enlarged fragmentary showing of a single injector unit.

The control means 16 can in itself be broken down into several parts, (1) the gearing mechanism in the injector itself to control each injector unit, (2) the means for actuating each gearing mechanism, and (3) a pilot or automatically controlled device for moving each actuating means. As can be seen in FIGURE 2, sleeve 36 is provided with a spline section 104 and sleeve 86 is provided with a spline section 106. These spline sections are for receiving gear members 108 and 110, respectively, having mating internal splines. When the gears are on the spline section, snap rings hold them in place. As stated hereinbefore, an attempt was made to maintain a predetermined flow of propellants over the face of the injector so after the size of the nozzle has been determined, the nozzle locations are placed in a predetermined position over the face.

Figure 4:
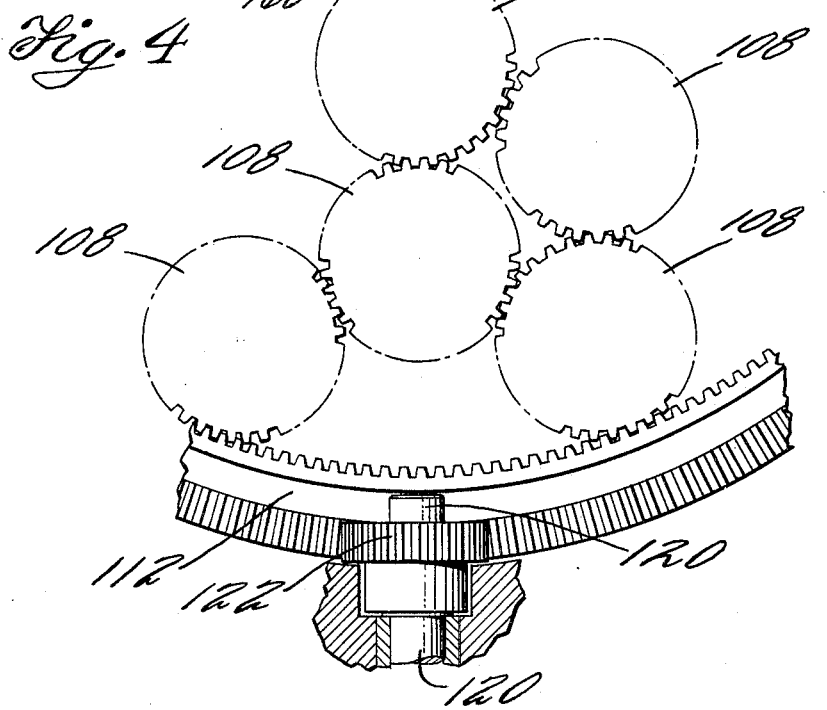
FIGURE 4 is a sectional view showing a part of the gear drive for a plurality of injector units.

Noting FIGURE 4, it can be seen that the nozzles are positioned so that the gears 108 are intermeshed with one or more of the other gears 108. The same arrangement is used for gears 110. Finally, an actuating ring gear 112 is provided to extend around the outer periphery of the injector between plates 14 and 32 having driving teeth meshing with a plurality of the gears 108 (or idler gears) so that this action alone supports the ring gear. The ring gear 112 has an outwardly extending flange 116 which has gear teeth mounted thereon. A projection 118 extends downwardly from rim 17 at the bottom of the injector and encloses a shaft 120 which extends from a point externally of the free end of projection 118 into the space between plates 14 and 32. A gear 122 is mounted on the end of shaft 120 within the injector and meshes with the teeth on flange 116. It can be seen that as shaft 120 is rotated, gear 122 will rotate thereby turning ring gear 112. This movement of ring gear 112 will in turn move the gears 108 having engagement therewith. The movement of these gears 108 will in turn move all of the other gears 108 through their cooperative meshing engagement. As mentioned before, idler gears can be used to properly locate any injector unit if necessary.

An actuating ring gear 130 is provided to extend around the outer periphery of the injector between plate 14 cap 28 having driving teeth meshing with a plurality of the gears 110 (or idler gears) so that this action alone supports the ring gear. The ring gear 130 has an outwardly extending flange 132 which has gear teeth mounted thereon. A projection 134 extends downwardly from the bottom of cap 28 and encloses a shaft 136 which extends from a point externally of the free end of projection 134 into the space between plate 14 and cap 28. A gear 138 is mounted on the end of shaft 136 within the injector and meshes with the teeth on flange 132. It can be seen that as shaft 136 is rotated, gear 138 will rotate thereby turning ring gear 130. This movement of ring gear 130 will in turn move the gears 110 having engagement therewith. A movement of these gears 110 will in turn move all of the other gears 110 through their cooperative meshing engagement.

The ring gear 112 is prevented from axial movement by the engagement of its gear teeth with gear 122 on one side and the location of a downwardly extending flange 111 on the opposite side of the end of shaft 120 which extends into the injector. The ring gear 132 is prevented from axial movement by the engagement of its gear teeth with gear 138 on one side and the location of a downwardly extending flange 137 on the opposite side of the end of shaft 136 which extends into the injector.

The throttling is provided for two reasons: (1) to control the flow rate and (2) to provide enough injector pressure drop to make combustion stable. If the pressure drop were too low, the propellant flow would oscillate causing a chamber pressure oscillation. The length and volume of the passages 30 is so small that the throttling obtained by rotating the sleeve 86 provides good flow stability at low flow rates, just as if it had been throttled at the injector face.

It is to be noted that shaft 120 is mounted within a bearing sleeve 150 which is fixed within projection 118 and shaft 136 is mounted within a bearing sleeve 152 which is fixed within projection 134. A gear 154 is fixed to the free end of shaft 120 extending out of the projection 118 and a gear 156 is fixed to the free end of shaft 136 extending out of projection 134.

As seen in FIGURE 1, a control box 160 is located below the projections 118 and 134 and contains drive means for the shafts 120 and 136. The drive means may be any known type of actuator, such as mechanical, hydraulic or electrical. Assuming that electric motors with an output shaft and gear are connected to each of the gears 154 and 156 of the respective propellant throttling means, an operating signal could be carried to each one respectively by conduits 168 and 170. While the operating signals could be manually initiated, they could also be initiated by automatic means, such as by a temperature responsive means, to maintain a uniform exhaust gas temperature.

In applications where a relatively low temperature exhaust gas is required, as for driving a turbine, the face plate 32 and core 54 may be uncooled, as in FIGURES 1 through 4. For very high temperature applications, such as main rocket combustion chambers, these parts may be cooled by appropriate means, such as by use of porous material, through which some of one propellant is allowed to flow.

OPERATION

When a signal is transmitted through conduit 170, whether it be by manual means or automatic means, this signal operates the actuating device within the control box 160 to rotate gear 164. This gear in turn rotates gear 122 by shaft 120, and the rotation of gear 122 rotates ring gear 112 within the injector. This movement of ring gear 112 in turn rotates all of the sleeves 36 of all the injector units of the injector. Some of the sleeves 36 will be moved by a direct connection of their gears 108 to ring gear 112, and others will be driven by intermeshing of like gears 108, and some could be actuated by the use of idler gears. As stated hereinbefore, the rotation of sleeve 36 provides for axial movement thereof with respect to the annular projection 20 and this provides for the throttling of one propellant.

When a signal is transmitted to conduit 168, this signal operates the actuating device within the control box 160 to rotate gear 156. This gear in turn rotates gear 138 by shaft 136, and the rotation of gear 138 rotates ring gear 132 within the injector. This movement of ring gear 132 in turn rotates all of the sleeves 86 of all the injector units of the injector. Some of the sleeves 86 will be moved by a direct connection of their gears 110 to ring gear 132, others will be driven by intermeshing of like gears 110, and some could be actuated by the use of idler gears. As stated hereinbefore, the rotation of sleeve 86 provides for axial movement thereof with respect to annular projection 80 and this provides for throttling of another propellant.

It is to be understood that the invention is not limited to the specific description above or other specific figures, but may be used in other ways without departure from its spirit as defined by the following claims.

We claim:

1. A controllable propellant rocket injector including:
   (a) a face plate means for communicating with a combustion chamber,
   (b) a second plate means which forms a first propellant chamber with said face plate means,
   (c) cap means which forms a second propellant chamber with said second plate means,
   (d) said face plate means having an opening therein,
   (e) said second plate means having an annular projection means extending therefrom with injection means extending into said opening,
   (f) throttling means movable with relation to said annual projection means,
   (g) portions of said injection means of said annular projection means and said throttling means forming annular passageways,
   (h) first passage means for connecting the first propellant chamber to said annular passageways,
   (i) opening means in the end of said injection means of said annular projection means, and
   (j) second passage means connecting the second propellant chamber to said opening means in the end of said injection means of said annular projection means.

2. A controllable propellant rocket injector as set forth in claim 1 including:
   (k) means for actuating said throttling means to vary the area of the annular passageways.

3. A controllable propellant rocket injector as set forth in claim 2 including:
   (l) means for varying the flow through the second passage means.

4. A controllable propellant rocket injector including:
   (a) a face plate means for communicating with a combustion chamber,
   (b) a second plate means which forms a first propellant chamber with said face plate means,
   (c) cap means which forms a second propellant chamber with said second plate means,
   (d) said face plate means having an opening therein,
   (e) said second plate means having an annular projection with an inner and outer annular surface extending therefrom into said opening,
   (f) throttling means movable with relation to said annular projection,
   (g) portions of said annular projection and said throttling means forming two annular passageways,
   (h) one of said passageways being formed with the outer annular surface of said annular projection,
   (i) the other of said passageways being formed with the inner annular surface of said annular projection,
   (j) first passage means for connecting the first propellant chamber to said two annular passageways,
   (k) an annular opening in the end of said annular projection between said inner and outer surfaces, and
   (l) second passage means connecting the second propellant chamber to said annular opening in the end of said annular projection.

5. A controllable propellant rocket injector including:
   (a) a face plate means for communicating with a combustion chamber,
   (b) a second plate means which forms a first propellant chamber with said face plate means,
   (c) cap means which forms a second propellant chamber with said second plate means,
   (d) said face plate means having an opening therein,
   (e) said second plate means having an annular projection extending therefrom into said opening,
   (f) throttling means movable with relation to said annular projection,
   (g) said throttling means including:
       (1) a sleeve around said annular projection,
       (2) said sleeve being mounted for axial movement in relation to said projection,
       (3) a core located in said annular projection,
       (4) means connecting said sleeve to said core transmitting axial movement of one to the other, and
       (5) said sleeve and said core forming two annular passageways with said annular projection,
   (h) first passage means for connecting the first propellant chamber to said two annular passageways,
   (i) an annular opening in the end of said annular projection, and
   (j) second passage means connecting the second propellant chamber to said annular opening in the end of said annular projection.

6. A controllable propellant rocket injector including:
(a) a face plate means for communicating with a combustion chamber,
(b) a second plate means which forms a first propellant chamber with said face plate means,
(c) cap means which forms a second propellant chamber with said second plate means,
(d) said face plate means having an opening therein,
(e) said second plate means having an annular projection extending therefrom into said opening,
(f) throttling means movable with relation to said annular projection,
(g) portions of said annular projection and said throttling means forming two annular passageways,
(h) first passage means for connecting the first propellant chamber to said two annular passageways,
(i) an annular opening in the end of said annular projection,
(j) second passage means connecting the second propellant chamber to said annular opening in the end of said annular projection, and
(k) said second plate means having a recess connected to said second propellant chamber,
   (1) said second passage means opening into the recess,
   (2) a sleeve in said recess,
   (3) said sleeve being mounted for axial movement in said recess, and
   (4) said sleeve cooperating with said second plate means to provide a variable restriction between said second propellant chamber and said second passage means.

7. A controllable propellant rocket injector including:
(a) a face plate means for communicating with a combustion chamber,
(b) a second plate means which forms a first propellant chamber with said face plate means,
(c) cap means which forms a second propellant chamber with said second plate means,
(d) said face plate means having an opening therein,
(e) said second plate means having an annular projection extending therefrom into said opening,
(f) throttling means movable with relation to said annular projection,
(g) said throttling means including:
   (1) a sleeve around said annular projection,
   (2) said sleeve being mounted for axial movement in relation to said projection,
   (3) a core located in said annular projection,
   (4) means connecting said sleeve to said core transmitting axial movement of one to the other, and
   (5) said sleeve and said core forming two annular passageways with said annular projection,
(h) first passage means for connecting the first propellant chamber to said two annular passageways,
(i) an annular opening in the end of said annular projection,
(j) second passage means connecting the second propellant chamber to said annular opening in the end of said annular projection, and
(k) said second plate means having a recess connected to said second propellant chamber,
   (1) said second passage means opening into the recess,
   (2) a sleeve in said recess,
   (3) said sleeve being mounted for axial movement in said recess, and
   (4) said sleeve cooperating with said second plate means to provide a variable restriction between said second propellant chamber and said second passage means.

8. A controllable propellant rocket injector including:
(a) a face plate means for communicating with a combustion chamber,
(b) a second plate means which forms a first propellant chamber with said face plate means,
(c) cap means which forms a second propellant chamber with said second plate means,
(d) said face plate means having an opening therein,
(e) said second plate means having an annular projection extending therefrom into said opening,
(f) means forming a nozzle with said annular projection,
(g) first passage means for connecting the first propellant chamber to said nozzle,
(h) an annular opening in the end of said annular projection,
(i) second passage means connecting the second propellant chamber to said annular opening in the end of said annular projection, and
(j) said second plate means having a recess connected to said second propellant chamber,
   (1) said second passage means opening into the recess,
   (2) a sleeve in said recess,
   (3) said sleeve being mounted for axial movement in said recess, and
   (4) said sleeve cooperating with said second plate means to provide a variable restriction between said second propellant chamber and said second passage means.

9. A controllable propellant rocket injector including:
(a) a first source of one propellant,
(b) a second source of a second propellant,
(c) an injector face,
(d) said face having a passageway therethrough,
(e) an annular member extending into said passageway and forming an outer annulus therewith,
(f) a core member in said annular member forming an inner annulus therewith,
(g) an annular opening at the end of said annular member in said passageway located between said outer and inner annuli,
(h) first passage means extending from said first source to said outer and inner annuli,
(i) second passage means extending from said second source to said annular opening, and
(j) means for varying the area of said outer annulus and said inner annulus.

10. A controllable propellant rocket injector including:
(a) a first source of one propellant,
(b) a second source of a second propellant,
(c) an injector face,
(d) said face having a sleeve extend therethrough,
(e) an annular member extending into said sleeve and forming an outer annulus therewith,
(f) a core member in said annular member forming an inner annulus therewith,
(g) an annular opening at the end of said annular member in said sleeve,
(h) first passage means extending from said first source to said outer and inner annuli,
(i) second passage means extending from said second source to said annular opening, and
(j) means for moving said sleeve and core member to vary the area of said outer and inner annuli.

11. A controllable rocket injector including:
(a) an injector face,
(b) said face having a circular opening therein,
(c) a sleeve member mounted for axial movement with respect to said opening,
(d) a center core member fixed to move with said sleeve member forming an annular space with said sleeve member,
(e) an annular member projecting into the space between said sleeve member and said center core member forming a first annular opening with said sleeve member and a second annular opening with said center core member, (f) said annular member having a third annular opening in the end thereof,
(g) means for axially moving said sleeve member and center core member to vary the first and second annular openings, and
(h) means for controlling flow to said third annular opening.

12. A controllable rocket injector as set forth in claim 11 wherein:
(i) said sleeve member is tapered inwardly at its end and the adjacent end of the center core member is tapered outwardly.

13. A controllable rocket injector as set forth in claim 11 wherein:

(j) a first propellant is directed to both the first annular opening and second annular opening, and
(k) a second propellant is directed to said third annular opening.

References Cited
UNITED STATES PATENTS 3,064,903  11/1962  Butler _____ 60—35.6

SAMUEL FEINBERG, Primary Examiner

U.S. Cl. X.R.

60—258; 239—416, 420, 424